Aug. 15, 1944.  C. S. ASH  2,355,941
BOGIE WHEEL
Filed May 30, 1942  2 Sheets-Sheet 1

INVENTOR
BY
ATTORNEY

Aug. 15, 1944.                C. S. ASH                 2,355,941
                              BOGIE WHEEL
                          Filed May 30, 1942        2 Sheets-Sheet 2

INVENTOR
Charles S. Ash
BY
Hobart T. Disha
ATTORNEY

Patented Aug. 15, 1944

2,355,941

UNITED STATES PATENT OFFICE 2,355,941

BOGIE WHEEL

Charles S. Ash, Milford, Mich.

Application May 30, 1942, Serial No. 445,117

7 Claims. (Cl. 301—63)

The present invention relates to new and useful improvements in wheels particularly for tanks and other vehicles having endless tracks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate three embodiments of the invention, and together with the description, serve to explain the principles of the invention.

The present invention has for its object the provision of an improved, simplified and strengthened tank wheel, which can be manufactured at a minimum of cost. A further object is the provision of a tank wheel which collects little mud and debris in running and which retains its strength to a high degree when partially demolished. Still another object is the provision of a wheel for tanks and other vehicles which can be made principally from simple, substantially duplicate drawn parts of stampings, and can be assembled quickly and efficiently by welding.

Figure 2:
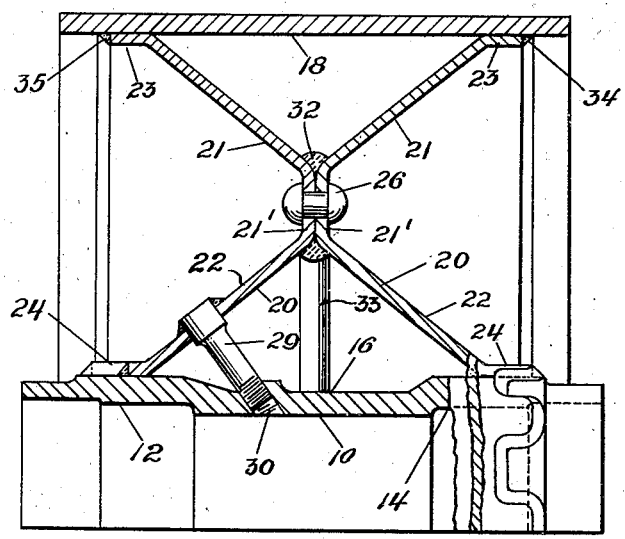
Figure 2 is a fragmentary longitudinal sectional view of one embodiment of the present invention shown in Figure 1.
Figure 1:
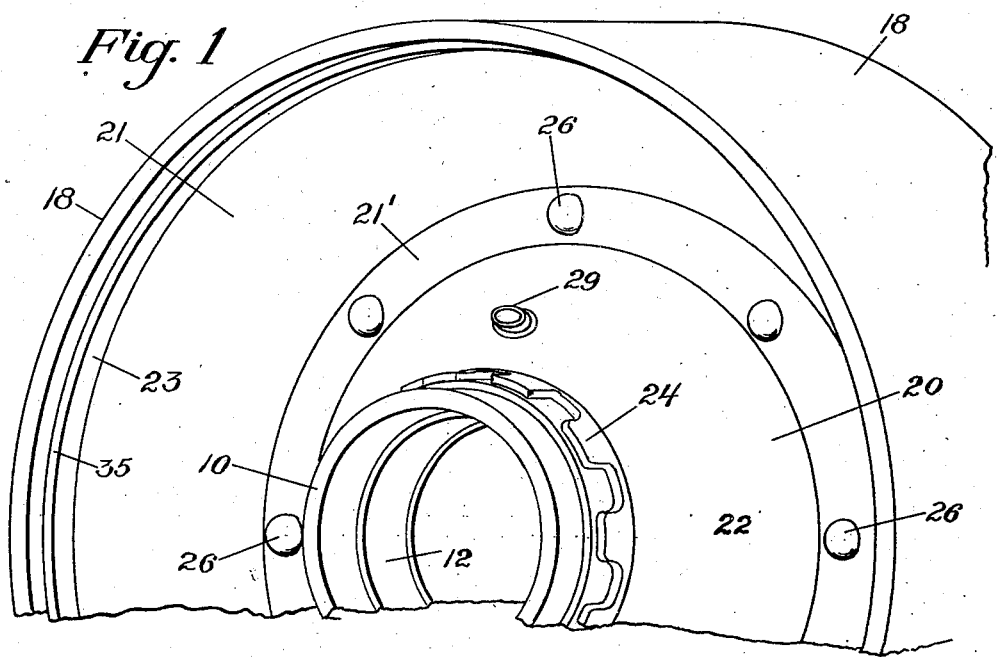
Figure 1 is a fragmentary perspective view of a typical and illustrative embodiment of the invention.

Referring now in detail to the illustrative embodiments of the invention as shown in the accompanying drawings, Figures 1 and 2 show the wheel without its tire, but ready to receive a pressed on tire which forms the endless track engaging and supporting member.

As shown, the wheel comprises a tubular hub member 10 which has its ends interiorly finished to provide bearing seats 12 and 14 and has its outer surface reduced intermediate its ends as at 16. The tire support comprises a hollow cylindrical member 18 which may be formed from a steel tube of the proper diameter and is slightly shorter than the hub 10.

Means are provided for rigidly supporting the cylindrical rim 18 on the hub member 10, and these means comprise a pair of annular channeled or double-frustroconical unitary load carrying elements 20 arranged on opposite sides of the center of the wheel and between the rim and the hub member. As shown in Fig. 2, each of these load carrying elements comprises an outer frustoconical member 21 and an inner frustoconical member 22 surrounded thereby. These members flare or diverge in opposite directions relative to each other, the member 21 outwardly or toward the adjacent side of the wheel and the member 22 inwardly or toward the center of the wheel. The apex portion of the frustoconical member 21 and the base portion of the frustoconical member 22 are integrally united in line with the wheel center by a flat annular connecting wall or portion 21'. From the portion 21' the walls of the frustoconical body of the member 21 of each load carrying element diverge on straight lines and at an angle to the vertical plane of the wheel toward the edge of the rim 18 at the side of the wheel on which said element is located. From the portion 21' the walls of the frustoconical body of the member 22 of each load carrying element, on the contrary, converge on straight lines at an angle to the vertical plane of the wheel toward the end of the hub at the side of the wheel on which said element is located. The annular portion 21' of each load carrying element is preferably positioned midway between the hub 10 and rim 18, and the angle of the walls of each frustoconical member 21 and 22 is preferably the same, although the members are of different diameters. The basal edges of the members 21 of the load carrying elements 20 terminate in integral flanges or cylindrical rims 23, which bear against and are rigidly secured to the inner periphery of the rim 18, while the apex portions of the members 22 of said load carrying elements terminate in cylindrical sleeves or rims 24 which embrace and are rigidly secured to the ends of the periphery of the hub 10.

The interior bore of the cylindrical rim 24 is preferably a tight or press fit on the outer portion of the hub 10, while the outer surface of the cylindrical rim 23 is preferably finished to provide a tight press fit at the interior surface of the cylindrical rim 18. Rim 24 is preferably scalloped or indented to provide an annular series of welding fingers giving a longer periphery so that the strength of the welded joint between the rim and hub is substantially increased. The adjacent annular portions 21' of the two load carrying elements 20 are provided with a circular series of registering holes by which the load carrying elements are connected together with rivets 26, The member 21 of one of the load carrying elements 20 is also apertured to receive a grease fitting 29 which is threaded into a grease hole 30 extending into the interior of the hub 10.

In assembling the wheel shown in Figure 2, the two load carrying elements 20 are positioned together in opposition to each other with their portions 21 in abutting relation, and such portions are united by the rivets 26. While held by the rivets an outer line of welding 32 is made between the members 22 at their point of juncture with the portions 21', and an inner line of welding 23 is made between the members 21 at their point of juncture with the portions 21'. The load carrying elements on the hub 10, and the cylindrical rim 18 are pressed over the assembly until the parts are in the position shown. The wheel is then welded uniformly along the lines 34 and 35 to secure the outer cylindrical rims 23 to the interior of rim 18, and the indented edge of rim 24 is welded to the outer surface of the hub 10. Thereafter the grease fitting 29 may be welded to the member 21 of the load carrying element 20 through which it passes.

The body portions of the members 21 and 22 of the load carrying elements are preferably true cone frustums to give maximum strength, as any curvature in radial sections of these members would impair their strength. The above described manner of assembling and uniting the parts and the angular arrangement of the walls of the members 21 and 22 provide a wheel construction of great strength and offering maximum resistance to compression.

Figure 3:
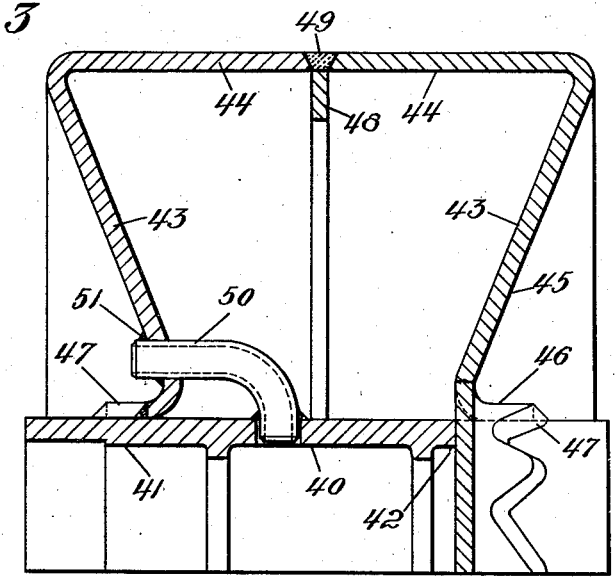
Figures 3 and 4 are similar views of other embodiments of the invention.

Figure 3 of the drawings illustrates a modified form of the invention in which the hub member 40 provided with its bearing seats 41, 42 has mounted on it two load carrying elements 43 having peripheries of cylindrical shape, integral therewith which form the tire or rim portion of the wheel. Each of these elements comprises a relatively heavy member the outer portion of which is cylindrical and forms a wheel forming portion 44. At one edge the cylinder 44 merges into a frusto-conical wheel body forming portion 45 which extends radially inwardly to a central cylindrical rim or sleeve 46 which extends axially outwardly and serves to secure the load carrying element to the hub. The cylindrical rim 46 is indented on its outer edge so as to increase the area of the welding 47, while the cylindrical interior of the rim 46 forms a tight press fit with the outer tubular portion of the hub 40. Between the adjacent ends of the cylindrical portions 44 is a thin annular member 48 extending from the inner surface of the cylinder 44 a short distance toward the hub, and this annulus 48 is secured to the edges of the rims 44, and the rims 44 are secured together by the circumferentially extending line of weld 49.

The grease fitting 50 is welded into the hub member 40, and passes through a suitable aperture in one of the load carrying elements 43 to which it is secured by the welding 51, and except for the aperture for the grease fitting, the two elements 43 may be duplicates of each other.

The load carrying elements 43 are preferably formed by a stamping or drawing operation and when so formed each is made from a single flat circular disk of metal. The central portion of the disk is pierced, bent and drawn in one direction to form the tubular portion 46, the frustoconical body portion is bent from the flat disk, and the outer cylindrical portion 44 is likewise bent and drawn in the other direction from the tubular portion 46. In this way, the cylindrical portion 44 is left in a compressed state while the frustoconical body portion 45, and the tubular portion 46 are left in a tensioned state, thereby greatly increasing the stability of the wheel. The frustoconical body portion 45 is also formed so that its radial sections are straight from points closely adjacent to the hub to the rim 44 thereby providing the maximum strength in the body portion of the wheel. Likewise, and as shown, the frustoconical body portions 45 of the two elements 43 are outwardly divergent thereby adding to the strength of the wheel, and at the same time minimizing the amount of mud and other debris which can collect on the wheel.

Figure 4:
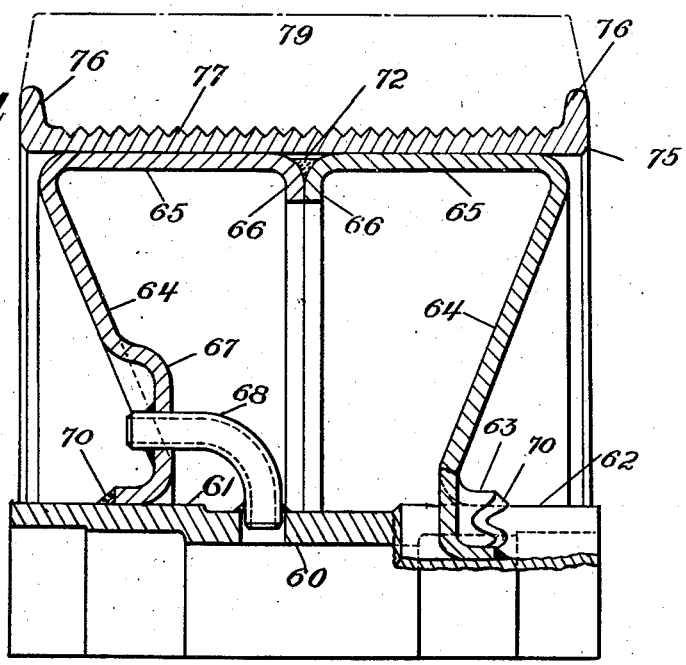

Figure 4 of the drawings shows the preferred modification of the invention which in many respects is similar to that shown in Figure 3. As embodied the tubular hub 60 is provided with finished end portions 61 and 62 which receive the outwardly extending inner flanges 63 of the load carrying elements 64. Frustoconical body portion 64 at its outer edge merges into an integral cylindrical rim 65 which extends in a direction opposite to the flange 63 and at the center line of the wheel is built over to form an inturned flange 66. One of the elements 64 is provided with a recess 67 in which is seated and welded the grease fitting 68. The lower half of the wheel (not shown) is similar, and its grease fitting 68 allows excess grease to be removed from the bearing.

The wheel of Figure 4 is assembled by pressing the left hand tightly fitting flange 63 of element 64 on the hub 60 to properly position said element after the grease fittings 68 have been welded to the hub. The fittings are then welded to the left hand element 64 and the right hand element 64 is pressed in place. Thereafter the flange 63 of each load carrying element is welded by an exterior line of welding 70 to the hub. When in finished position the inturned flanges 66 of the two elements abut, and the groove at their juncture is partially filled by a circumferential line of welding 72 which rigidly unites the rim forming portions of the load carrying elements together and completes the wheel structure, except for the tire portion which is usually used between the wheel and endless track. This tire portion is of conventional form and comprises an exteriorly channeled cylindrical member 75, having side rims 76 and a circumferentially grooved outer surface 77, the grooved portion between the side rim 76 being filled by the resilient member 79. The channeled cylindrical member 75 is tightly fitted to the exterior of the cylindrical portions 65 so that it may be pressed there-over and retained thereon. A similar tire structure may be used with the other forms of the invention, if desired. The load carrying elements of the structure shown in Figure 4 are likewise preferably formed from circular disks of steel or other suitable metal, and are pierced, stamped and drawn so as to leave the metal in the cylindrical portions 65 and the inturned flanges 66 in a compressed state, while the metal in the frustoconical body portions 64 and the tubular portions 63 is left in a tensioned state.

The pressed on tightly fitted member 75 holds the portions of the load carrying elements bound in such states, thus further increasing the strength of the wheel and its resistance to compression.

It will be noted that in all of the illustrated forms of the invention, the various parts may be completely assembled without requiring the use of fixtures, and it is impossible for the parts to be misaligned during their assembly as they are principally accurately centered on the hub member by relatively tight fits. Furthermore the amount of welding has been reduced to a minimum so that subsequent heat treatment or annealing of the finished wheels is not required, and the major portions of the wheel structure have not been subjected to the severe temperatures encountered in welding.

Inasmuch as the frustoconical body portions of the load carrying elements are in tension, piercing of the wheel body portions by shell fire does not essentially impair the strength of the wheel assembly unless a very considerable part of the wheel body portions has been destroyed, while the compressed parts of the wheel are resisted against tension by the surrounding channeled structure 75.

The invention in its broader aspects is not limited to the specific mechanisms shown and described but departures may be made therefrom within the scope of the accompanying claims without departing from the principles of the invention and without sacrificing its chief advantages.

What I claim is:

1. A metallic wheel comprising a hub, a rim, and a body formed independently of the rim and consisting of a pair of load carrying elements located on opposite sides of the center of the wheel, each element comprising an inner frustoconical member surrounding the hub and an outer frustoconical member surrounding the inner frustoconical member, said members having their walls flaring respectively toward opposite sides of the wheel, the inner member of each element having at its apex an outwardly extending sleeve portion welded to the end of the hub at the adjacent side of the wheel and the base of each outer member of each element having a flange portion secured to the rim at the adjacent side of the wheel, like members of the pair of elements being arranged in apposition with their convex sides facing each other and their concaved sides facing outwardly toward the sides of the wheel and said elements being provided with abutting portions united to each other at the wheel center and at a point radially equidistant from the hub and rim.

2. A wheel of the character described comprising a hub, and load carrying elements arranged at opposite sides of the vertical center of the wheel about the hub, and each consisting of a wheel body forming portion and a wheel rim forming portion, said body forming portions being united to the hub and formed of metal under tension and said rim forming portions being united to each other and formed of metal under compression.

3. A bogie wheel comprising a hub portion and a pair of load carrying elements having frustoconical body portions diverging outwardly from the hub and substantial duplicates of each other, the body portion of each load carrying element having an integral cylindrical sleeve portion welded to the hub, and an inwardly extending peripheral cylindrical rim forming portion, said body portions of the load carrying elements being formed of metal which is in tension, and said cylindrical rim forming portions of the load carrying element being formed of metal which is in compression and being arranged to abut at the center of the wheel and being welded circumferentially at their juncture.

4. A bogie wheel comprising a hub portion and a pair of load carrying elements having frustoconical body portions diverging outwardly from the hub and substantial duplicates of each other, the body portion of each load carrying element having an outwardly extending integral cylindrical sleeve portion scalloped at its outer edge, and welded to the hub, and an inwardly extending peripheral cylindrical rim forming portion, each of said cylindrical rim forming portions having an inturned flange, the flanges of said cylindrical rim forming portions being arranged to abut at the center of the wheel and being welded circumferentially at their juncture.

5. A bogie wheel comprising a hub portion and a pair of load carrying elements having frustoconical body portions diverging outwardly from the hub and substantial duplicates of each other, the body portion of each load carrying element having an outwardly extending integral cylindrical sleeve portion scalloped at its outer edge and welded to the hub, and an inwardly extending peripheral cylindrical rim forming portion, said cylindrical rim forming portions of the load carrying elements being formed of metal in compression and being welded circumferentially at their adjacent edges.

6. A bogie wheel comprising a hub portion and a pair of load carrying elements having frustoconical body portions diverging outwardly from the hub and substantial duplicates of each other, the body portion of each load carrying element having an outwardly extending integral cylindrical rim welded to the hub, and an inwardly extending peripheral cylindrical rim forming portion, said body portions and sleeves of the load carrying elements being formed of metal which is in tension, and said cylindrical rim forming portions of the load carrying elements being formed of metal which is in compression and being welded circumferentially at their adjacent edges.

7. A bogie wheel having a hub, a rim, and a body portion connecting the hub and rim, said body portion comprising a pair of frustoconical body forming members having spaced apart inner portions provided with outwardly extending integral cylindrical sleeves, said sleeves of said members being press fitted upon and welded to the outer surfaces of the ends of the hub, and a conducting tube extending at its outer end through one of the members into the space between the spaced apart inner portions of the members and communicating at its inner end with the interior of the hub.

CHARLES S. ASH.